United States Patent [15] 3,658,062
Kapur [45] Apr. 25, 1972

[54] ABSORBENT PRODUCTS HAVING A BIODEGRADABLE MOISTURE BARRIER

[72] Inventor: Chandra Kapur, East Brunswick, N.J.
[73] Assignee: Personal Products Company, Milltown, N.J.
[22] Filed: Mar. 9, 1970
[21] Appl. No.: 17,401

[52] U.S. Cl. ................... 128/287, 128/DIG. 8, 128/156, 128/290
[51] Int. Cl. .......................................... A61f 13/16
[58] Field of Search ............... 128/156, 285, 287, 290, 296, 128/DIG. 8

[56] References Cited

UNITED STATES PATENTS

| | | | |
|---|---|---|---|
| 2,340,311 | 2/1944 | Donovan | 128/285 |
| 3,230,955 | 1/1966 | Joa et al. | 128/290 R |
| 3,512,997 | 5/1970 | Cohly et al. | 128/296 X |
| 3,123,482 | 3/1964 | Lieberman | 128/DIG. 8 |
| 2,808,832 | 10/1957 | Myers et al. | 128/285 |
| 3,375,827 | 4/1968 | Bletzinger et al. | 128/290 |
| 2,202,566 | 5/1940 | Schulte | 128/285 |

FOREIGN PATENTS OR APPLICATIONS

| | | | |
|---|---|---|---|
| 885,978 | 1/1962 | Great Britain | 128/290 R |

Primary Examiner—Charles F. Rosenbaum
Attorney—W. Frederick Mayer, Jr. and Robert L. Minier

[57] ABSTRACT

Flushable absorbent products are provided with a fluid impervious barrier sheet of biodegradable collagenous film for the prevention of "strike-through" of body exudates absorbed thereby.

13 Claims, 7 Drawing Figures

PATENTED APR 25 1972 3,658,062
SHEET 1 OF 2
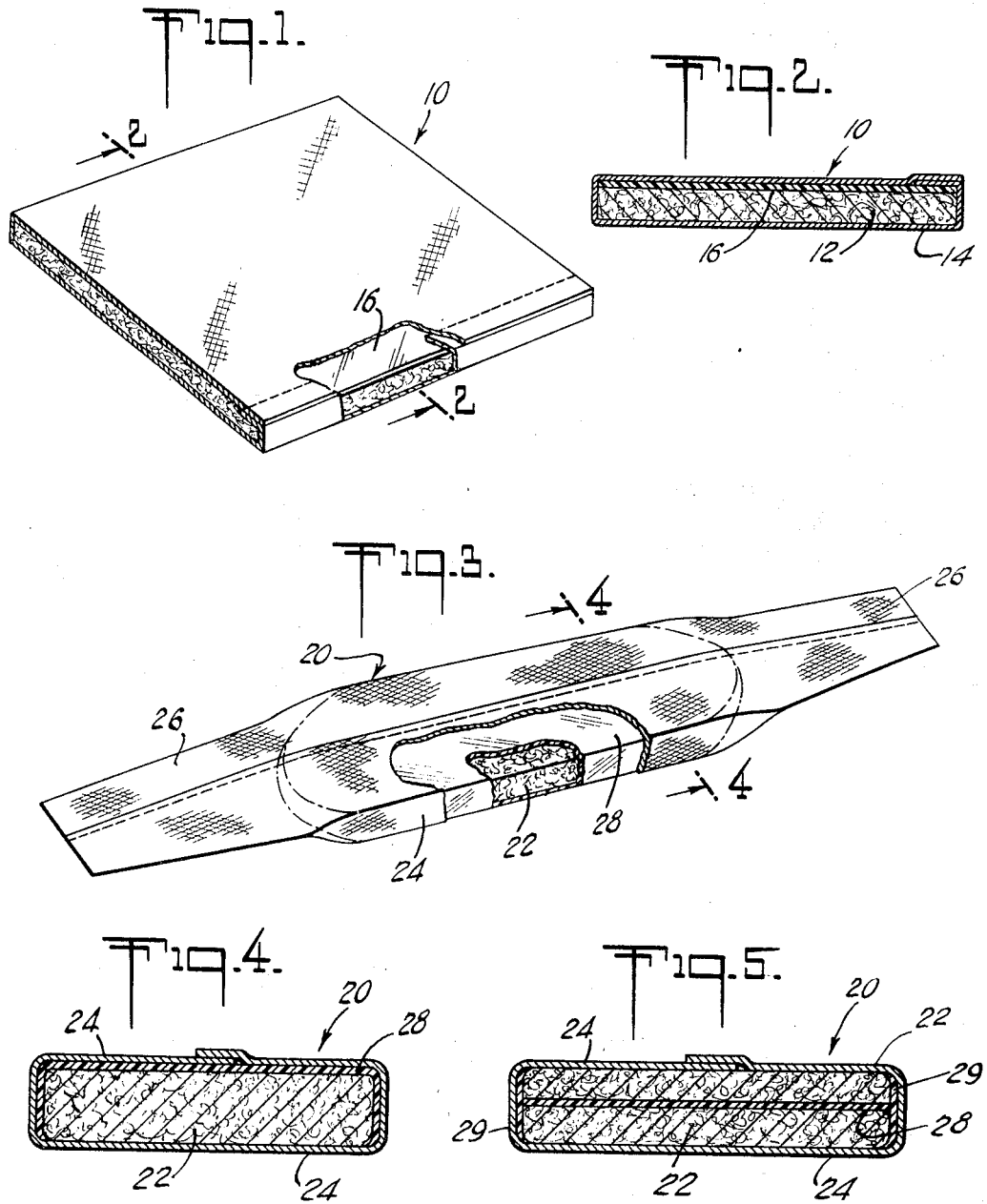
INVENTOR
CHANDRA KAPUR
BY
ATTORNEY

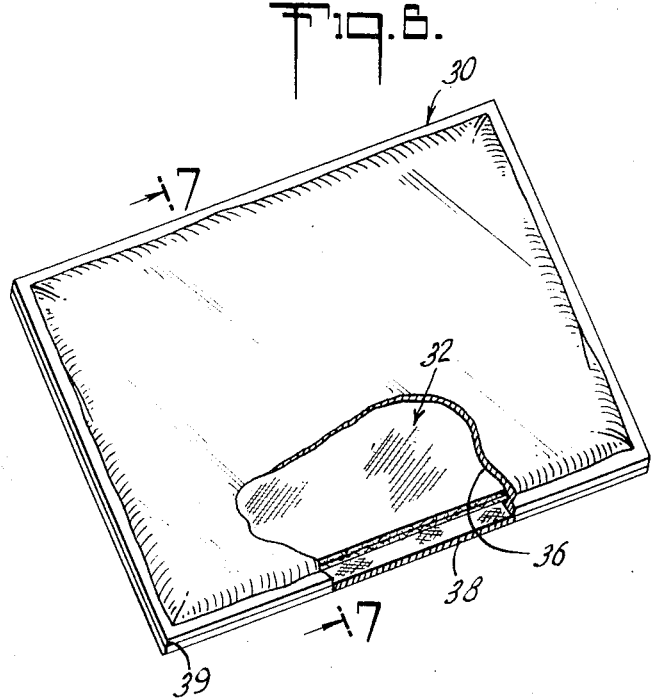
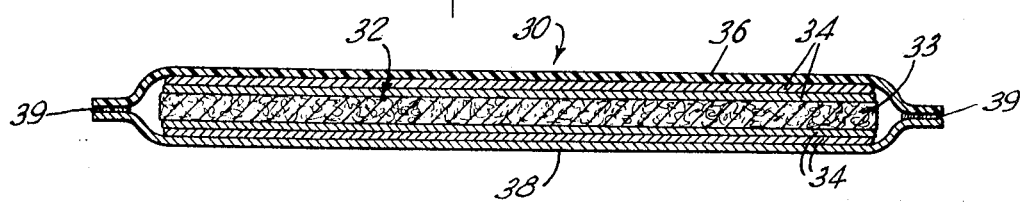

3,658,062

ABSORBENT PRODUCTS HAVING A BIODEGRADABLE MOISTURE BARRIER

BACKGROUND OF THE INVENTION

This invention relates to absorbent products and more particularly, is directed to improved absorbent products having biodegradable, fluid impervious, barrier sheets rendering them flushable subsequent to use.

It has long been the practice in making absorbent products such as surgical dressings, sanitary napkins, diapers, and the like to include a fluid impervious barrier sheet to prevent "strike-through" of body exudates when such dressings are in use. Conventionally such barrier sheets have been made of one or more plies of impregnated paper to render them repellent or semi-repellent, cellophane, rubber, thin films of polyethylene or polypropylene, and the like, with thin polyethylene films having proven most successful from a functional and commercial standpoint. However, because polyethylene and other polymeric films are relatively inert and are not attacked or broken down by bacteria normally found in public and private sewage disposal systems, absorbent products incorporating such films as moisture barriers cannot be safely flushed away in sewage disposal systems. Even though the other components of the absorbent product will rapidly disintegrate and be attacked by the bacteria in a public or private sewage disposal system, the polyethylene or polymeric films used as a barrier sheet remain intact and if they do not clog up piping and sewage disposal equipment, the sheets will pass through the sewage treatment plant causing pollution problems.

While some absorbent products in the past have used biodegradable materials for the purpose of preventing strike-through of body exudates mostly in the form of impregnated papers, the porosity of such papers have prevented them from functioning entirely satisfactorily in the manner intended. Similarly, cellophane films have been proposed which, being regenerated cellulose, are also biodegradable. However, in absorbent products, particularly sanitary napkins, the cellophane films are noisy tending to crinkle and be objectionable from the wear's standpoint.

From the above, it is readily seen that providing a truly flushable absorbent product containing a fluid impermeable barrier sheet for the prevention of strike-through of body exudates has presented those skilled in the art with a two-fold problem. Barrier materials which are satisfactory from a functional standpoint when the absorbent products are in use are not attacked and broken down in private and municipal sewage treatment systems and most of those materials which are broken down in municipal and private sewage treatment systems are not truly fluid impervious and thus fail to function in the manner intended.

I have now provided for the first time a truly flushable absorbent product incorporating a fluid impermeable barrier sheet which sheet is readily broken down by bacterial action in private and municipal sewage treatment systems.

SUMMARY OF THE INVENTION

According to the present invention, absorbent products such as surgical dressings, sanitary napkins, diapers, and the like, which include an absorbent core of fibrous material such as comminuted wood pulp fibers, regenerated cellulose fibers, cotton linters, bleached sulfite creped wadding, and the like or combinations thereof, have a fluid impervious barrier sheet included as a portion of the core. The fluid impervious barrier sheet is comprised of a thin film of reconstituted collagen. The collagenous film barrier sheet can be positioned on the bottom of the core (i.e., that portion of the absorbent core which is worn away from the body when the absorbent product is in use) and can also extend upwardly over the side edges of the absorbent core. Also, where it is desired for functional purposes, the collagenous film barrier sheet can be positioned intermediate the bottom and top surfaces of the core. In either construction, if desired, the absorbent core and collagenous barrier sheet can be encased in a fluid pervious cover.

DESCRIPTION OF THE DRAWINGS

The invention will be even more readily understood by reference to the following detailed description taken in conjunction with the accompanying drawings in which:

FIG. 1 is an overall perspective view of a surgical dressing pad incorporating the fluid impermeable barrier sheet of the present invention and is shown as viewed from the surface placed away from the body when in use;

FIG. 2 is a cross sectional view taken approximately along lines 2—2 of FIG. 1;

FIG. 3 is an overall perspective view of a sanitary napkin incorporating the fluid impermeable barrier sheet of the present invention and is shown as viewed from the bottom;

FIG. 4 is a cross sectional view taken approximately along lines 4—4 of FIG. 3;

FIG. 5 is a transverse cross sectional view of a modified form of the sanitary napkin of FIG. 3;

FIG. 6 is a perspective view of a diaper incorporating the fluid impervious barrier sheet of the present invention; and FIG. 7 is a cross sectional view taken approximately along lines 7—7 of FIG. 6.

DETAILED DESCRIPTION OF THE INVENTION

Referring now first to FIGS. 1 and 2, a surgical dressing, generally designated by the numeral 10, in the form of a pad which is suitable as a wound dressing or a dressing for surgical incisions includes an absorbent core 12 of comminuted wood pulp fibers and a nonwoven cover 14 surrounding the core and overlapping on the bottom surface of the core (i.e., the surface of the dressing worn away from the body when the pad is in use). Overlying the bottom surface of the core 12 within the cover 14 is a fluid impervious barrier sheet 16 in the form of a collagenous film.

For the collagenous film barrier sheet 16 I have found particularly suitable collagenous films made in accordance with the teachings of U.S. Pat. No. 3,123,482 issued to E. R. Lieberman on Mar. 3, 1964, particularly those compositions set forth in Examples VII and VIII thereof. While the description of the apparatus and methods contained in the Lieberman patent is directed to the extrusion of collagen casings, i.e., tubular form, the tubular collagen so produced can be slit longitudinally to form a film of about 1 mil in thickness. Similarly, using suitable extrusion equipment, the same collagenous formulations could be extruded initially in flat film form thus eliminating the slitting operation required to transform the tubular collagen casing into a flat film form.

It is further apparent from the description and examples contained in U.S. Pat. No 3,123,482 that edible grades of collagen casing are obtained but for the purposes of the present invention such a property is not required. To this end, many substitutes for the ingredients can be made in the compositions disclosed. For example, the glycerol plasticizer disclosed in the examples of U.S. Pat. No. 3,123,482 can be substituted by other plasticizers such as ethylene glycol, diethylene glycol, polyethylene glycols, propylene glycols, polypropylene glycols, 1,3-butylene glycol, 1,3-propanediol, urea, trimethylamine hydrochloride, 1,2,6-hexanetriol, 1,5-pentanediol, block copolymers of polyoxypropylene and polyoxyethylene, hexitols, oxyalkylene derivatives of hexitols, and the like. The preferred plasticizers are glycerol and higher molecular weight polyalkylene glycols because of their availability, moderate cost and absence of crystallization problems. Most preferred plasticizer materials are the polyethylene glycols having molecular weight ranges from at least about 250 up to about 700 because they exhibit the least migration from the collagenous film on storage while producing the most satisfactory pliability and softness in the collagenous film.

Depending upon the softness desired in the collagenous film, the plasticizers used will be present in an amount by weight ranging from about 15 percent to about 35 percent and preferably about 20 percent. An amount of plasticizer below about 15 percent by weight produces a collagenous film which is relatively stiff and generally would be unsuitable in absorbent products while the presence of plasticizer in amounts above about 35 percent by weight produces a film that tens to be tacky and limp, rendering it difficult to handle on production equipment used to make absorbent products.

While the collagenous materials produced by all of the examples and description contained in U.S. Pat. No. 3,123,482 are suitable for the collagenous film barrier sheets of the present invention, the materials produced by Examples VII and VIII are most preferred because of the incorporation of relatively inexpensive wood pulp cellulose fibers employed as extenders. Similarly, because edible grade collagenous film is not required, greater amounts of extenders such as soft or hard wood pulp can be employed, and accordingly, can range in the ultimate collagenous film produced in an amount by weight ranging from about 5 percent to about 25 percent with about 10 percent being preferred.

Also, the biodegradable collagenous films made according to the teachings of the Lieberman patent contain an amount of water ranging by weight from about 15 percent to about 25 percent and preferably about 20 percent. The moisture content of the film imparts thereto a softness and tear resistance making it ideally suitable in the products of the present invention.

The matrix of the barrier sheet into which the plasticizers, extenders and moisture are incorporated consists of proteinaceous collagen, and is present in an amount by weight ranging from about 40 percent to about 75 percent and preferably about 50 percent. Again, because the Lieberman patent is concerned with producing edible collagen casings, the collagen produced by his teachings is present in the form of fibrils as opposed to fibers. However, since edible collagen films are not required in the absorbent products of the present invention, films made by other known techniques for producing reconstituted collagen can be used. Such processes include those where the collagen fibers and fiber bundles are not broken down into fibrils even though films of such materials might tend to be a bit stiffer. The increased stiffness if it is present can be compensated for by adjusting the percentage of plasticizers, extenders and moisture present in the films.

In the embodiment of the invention depicted in FIGS. 3 through 5, the collagenous film barrier sheet is incorporated in sanitary napkins 20. The napkin 20 consists of an absorbent core 22 encased in a fluid pervious cover 24 which extends beyond the ends thereof to form the usual attachment tabs 26. As shown particularly in FIGS. 3 and 4, the collagenous barrier sheet 28 is positioned at the bottom of the absorbent core, i.e., the surface worn away from the body when the napkin is in use, and extends upwardly over the side edges of the napkin 20, forming a so-called "boat type" construction. In this form, substantially the whole absorbent core 22 is available for the absorption of menstrual fluid intercepted thereby and is thus referred to as a "one-way" napkin.

In the sanitary napkin embodiment shown in FIG. 5, the collagenous film barrier 28 is positioned in the interior of the absorbent core 22 having absorbent material on both sides of the barrier. Also, if desired, side strips 29 of the collagenous film barrier can be placed along the side edges of the core 22 to prevent side spread failure. In this type of sanitary napkin 20, either the top or the bottom surface of the napkin can be placed adjacent the body in use and therefore is referred to as a so-called "two-way" napkin.

In FIGS. 6 and 7, a diaper 30 is shown which includes an absorbent core 32 of wood pulp fibers 33, and four plies of absorbent creped tissue wadding 34. On the bottom surface of the core 32 (the surface worn away from the body) is a collagenous barrier sheet 36. The top surface of the core 32 is covered with a sheet of nonwoven fabric 38 which preferably exhibits hydrophobic characteristics to assure a dry surface when the diaper is in use. All the layers of the absorbent core 32, i.e., the wood pulp fibrous layer 33 and the creped tissue wadding layers 34, are maintained as a unit by having the collagenous film barrier sheet 36 and the fluid pervious cover sheet 38 secured to one another along their marginal edges by a suitable adhesive 39 or by stitching.

In each of the embodiments of the present invention set forth above, the fluid impervious collagenous barrier sheets prevent fluids from passing through the absorbent pad under conditions of use. Particularly in the sanitary napkin embodiments, however, an unexpected advantage in the use of such films was found. Upon being wetted with menstrual fluids, the collagenous barrier sheets became even less stiff than when in the dry state, thereby improving comfort and substantially eliminating any discernible noise that is often associated with barrier sheets of other materials. Also, upon destructive examination of sanitary napkins subsequent to being worn, it was found that the collagenous barrier sheets tended to cling and adhere to the adjacent absorbent core, which helps to insure the barrier sheet will remain in its proper position within the napkin during use.

While I have described several illustrative embodiments of improved absorbent products according to my invention, it is apparent that many modifications, alterations, changes and additions can be made thereto while still remaining within the spirit and scope of the invention as defined in the following claims.

I claim:

1. In an absorbent product having an absorbent core and a fluid impervious barrier, the improvement comprising a barrier sheet of collagenous film.

2. The improvement of claim 1 wherein said collagenous film barrier sheet is positioned on the bottom of said core.

3. The improvement of claim 1 wherein said collagenous film barrier sheet is positioned intermediate the bottom and top surfaces of said core.

4. The improvement of claim 1 wherein said collagenous film barrier sheet overlies the side edges of said core.

5. The improvement of claim 1 wherein a fluid pervious cover sheet overlies the top surface of said core.

6. The improvement of claim 1 wherein said absorbent core and said barrier sheet are encased in a fluid pervious cover.

7. The improvement of claim 6 wherein said fluid pervious cover extends beyond the ends of said absorbent core.

8. The improvement of claim 1 wherein said barrier sheet is a cross-linked collagenous film having a thickness of about 0.001 inch and is comprised of collagen, a plasticizer, water and cellulose.

9. The improvement of claim 8 wherein said collagenous film is comprised of the following in amounts by weight based upon the weight of the film:

| Collagen | from about 40% to about 70% |
| Plasticizer | from about 15% to about 35% |
| Water | from about 15% to about 25% |
| Cellulose | from about 5% to about 25% |

10. The improvement of claim 8 wherein said collagenous film is comprised by weight based upon the weight of the film of about 50 percent collagen, 20 percent glycerin, 20 percent water and 10 percent cellulose.

11. The improved absorbent product of claim 1 in the form of a surgical dressing.

12. The improved absorbent product of claim 1 in the form of a sanitary napkin.

13. The improved absorbent product of claim 1 in the form of a diaper.

* * * * *